United States Patent

[11] 3,594,535

[72] Inventors Victor Fu-Hua Chu
East Brunswick;
Abraham Bernard Cohen, Springfield;
Herbert Albert Tobias, New Brunswick, all of, N.J.
[21] Appl. No. 700,117
[22] Filed Jan. 24, 1968
[45] Patented July 20, 1971
[73] Assignee E.I. du Pont de Nemours and Company
Wilmington, Del.

[54] IMAGE TRANSFER MACHINE FOR GRAPHIC ARTS PHOTOPOLYMER FILM
12 Claims, 7 Drawing Figs.

[52] U.S. Cl. .......... 219/216, 250/65 T
[51] Int. Cl. .......... H05b 1/00
[50] Field of Search .......... 219/201, 216; 250/65 T; 156/230—233, 240—249, 523, 540, 550, 584; 355/78, 107

[56] References Cited
UNITED STATES PATENTS
2,740,895 4/1956 Miller .......... 250/65.1
2,769,391 11/1956 Roshkind .......... 250/65.1 UX

*Primary Examiner*—J. V. Truhe
*Assistant Examiner*—C. L. Albritton
*Attorney*—Lynn Barratt Morris ABSTRACT: Apparatus for achieving dry image transfer employing photohardenable elements for surface transfer to suitable image-receptive supports. The apparatus comprises
1. means for supporting and holding an image-receptor element in a fixed position with respect to the imagewise exposed photohardenable matrix, and
2. a carriage which moves along the laminae of the image-receptor element and matrix element, and which has means for pressing or laminating the elements in surface register, and means for stripping the matrix element from the image-receptor element after lamination

INVENTORS
VICTOR FU-HUA CHU
ABRAHAM BERNARD COHEN
HERBERT ALBERT TOBIAS

BY Lynn Barratt Morris
ATTORNEY

INVENTORS
VICTOR FU-HUA CHU
ABRAHAM BERNARD COHEN
HERBERT ALBERT TOBIAS
BY Lynn Barratt Morris
ATTORNEY INVENTORS
VICTOR FU-HUA CHU
ABRAHAM BERNARD COHEN
HERBERT ALBERT TOBIAS
BY Lynn Barratt Morris
ATTORNEY

IMAGE TRANSFER MACHINE FOR GRAPHIC ARTS PHOTOPOLYMER FILM

SUMMARY OF THE INVENTION

The image-transfer machine is capable of precision dry image transfer, either at room temperature or elevated temperature, and employs an imagewise exposed photohardenable, image bearing matrix element and an image-receptive element. In general, the apparatus comprises:

a. a stationary base member having means for holding an image-receptor element;

b. means for aligning an imagewise exposed matrix element having a photohardenable layer in contact with the surface of the image-receptor element;

c. a carriage that is adapted to move along the surface of the superposed elements;

d. means on the carriage for pressing the matrix element into surface contact with the image-receptor element as the carriage moves along the surface of the superposed elements;

e. means on the carriage for stripping the matrix element from the image-receptive element after pressure is applied to the superposed elements, said means being capable of holding the leading edge of the matrix element.

It will be apparent to those skilled in the art that if the process requires it, the imagewise exposed matrix element may be held on the stationary support surface, and the carriage apparatus may act directly on the image receptor to press and then strip it from the matrix element.

The apparatus may also incorporate machine elements to measure and control (1) the carriage speed and direction, (2) the quantity of heat applied to the matrix-receptor sandwich, (3) the stripping angle, and (4) the stripping tension.

BACKGROUND OF THE INVENTION

Suitable dry image-bearing matrix elements useful for image transfer are disclosed in U.S. Pat. Nos. 3,060,023; 3,060,024; 3,060,025; 3,060,026; and 3,202,508. In addition, various machines for effecting this dry image transfer have been proposed. One such machine disclosed in U.S. Pat. No. 3,211,074 incorporates means for transferring the image from a continuous web matrix to an image-receptive support and is most useful for making office copies of letters or other regular-shaped papers. Another machine, described in U.S. Pat. No. 3,336,461, employs sheet fed matrices and image receptors in which the pressing and stripping means are fixed and the matrix-image receptor sandwich is driven through the machine.

The machines embodied by the present invention make use of a system whereby the imagewise exposed matrix-image receptor sandwich is held stationary with respect to the machine support while a carriage, bearing the laminating means and the stripping means, moves along the surface of the sandwich. This system benefits from various advantages not inherent in the prior art systems. Thick, rigid image receptors, like those found in photoresist processes, can be easily imaged using the present apparatus, as can oddly shaped planar matrices and matrices coated on very thin and highly flexible matrix support materials. Another advantage is that the image in the matrix may be placed anywhere on the image-receptor. In addition, since conventional punch-pin registration systems can be used in conjunction with the present machine, precise image registration is facilitated.

BRIEF DESCRIPTION OF THE DRAWINGS

The invention will now be described more fully with reference to the accompanying drawings.

DESCRIPTION OF THE PREFERRED EMBODIMENTS

Figures 1, 2:
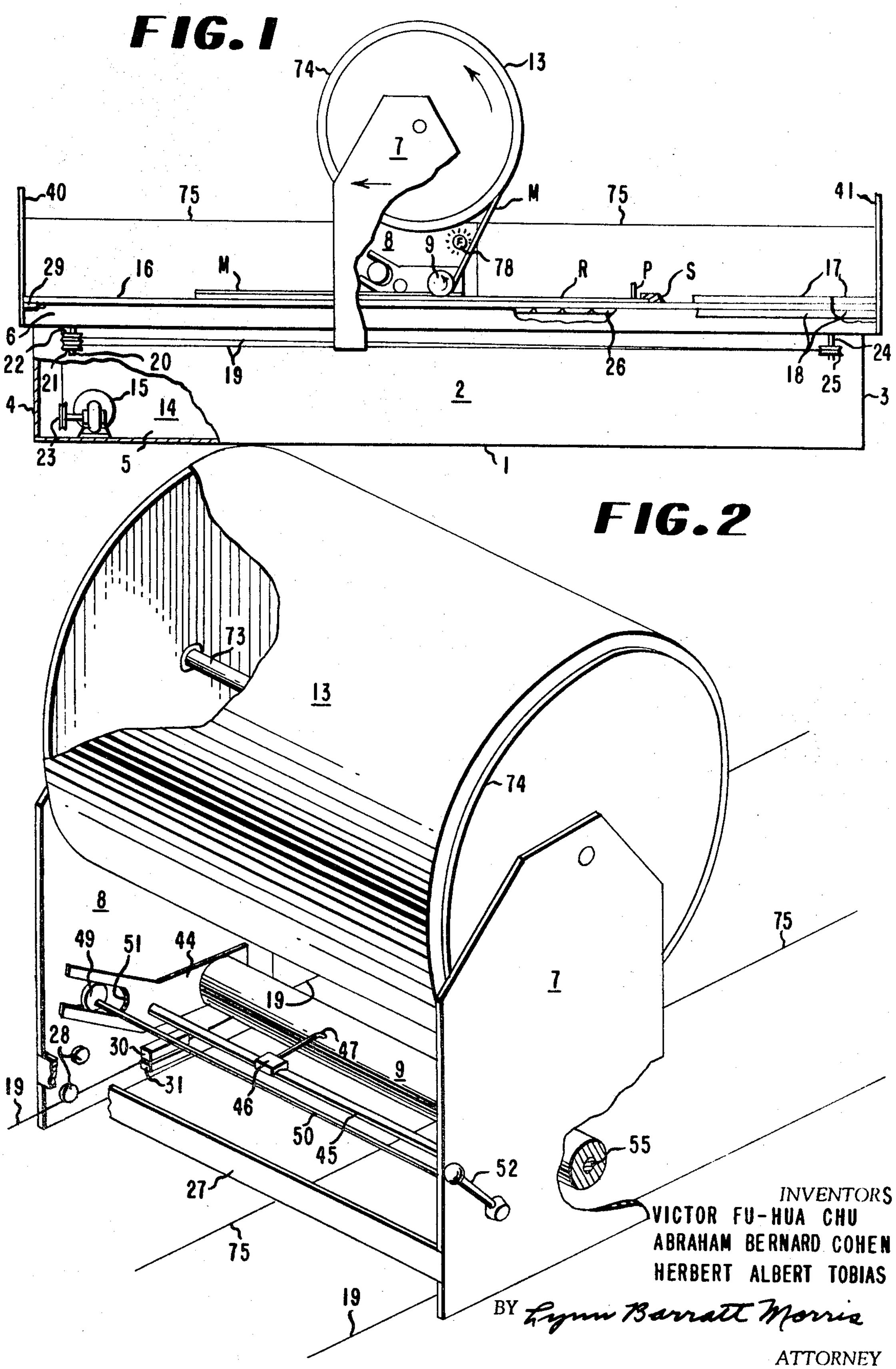
FIG. 1 is a side elevation with parts in section of an embodiment of a machine of the invention.
FIG. 2 is an isometric view of a carriage and associated parts of the machine of FIG. 1.

With reference to the drawings, where the same reference numerals refer to the same parts throughout the several views, the image-transfer machine comprises a base, 1; vertical partitions, 2, 3, 4, 5; a transfer support platform, 6, and a carriage comprised of (1) sideplates, 7, 8; (2) pressure application means, e.g., a pressure application roller, 9, a plurality of pressure application rollers, 10, 11, a slidable pressure application shoe, 12, a pressure application belt, 34, or a combination of the above; and a stripping drum, 13. The compartment, 14, created by the base, vertical partitions and transfer support platform, houses the reversible, variable speed machine motor drive, 15, and drive transmission means, which may be a cable drive (see FIG. 1), a rotating screwdrive, (see FIG. 3), a rack and pinion drive, etc.

The transfer support platform, 6, has a resilient pad, 16, covering it in the operating lamination areas of the platform. This pad may have a fiber backing. The platform is bordered on two parallel, top sides by rails, 17, and two parallel, bottom sides by a second set of rails, 18. At least one rail has carriage guide means incorporated in it. Under each corner of the platform are mounted pulleys for the main drive cable, 19. A fixed shaft, 20, is mounted under each corner at the main motor drive end of the platform, and on this shaft are mounted two independently rotatable pulleys, 21, 22, which guide the main drive cable as it enters and leaves the cable sheave, 23. A fixed shaft, 24, and single pulley, 25, are mounted under each corner at the opposite end of the platform to direct the main drive cable in making a 180° turn. At each end of the transfer support platform, 6, are fastening means (not shown) to hold the resilient pad, 16, securely to and flat against the platform. Alternatively the pad may be bonded permanently to the platform. Contiguous to the underside of the transfer support platform may be mounted a series of heaters, 26.

The carriage frame is comprised of two parallel sideplates, 7, 8, and a cross support, 27, fastened to each sideplate. Two pairs of rollers, 28, are rotatably mounted on each sideplate so that one roller in each pair rides on the bottom rail 18. The line of travel of the carriage is constrained by these rollers riding within the guide means incorporated in at least one of the rails. At each end of the carriage travel the carriage contacts a microswitch, 29, which is adjustably mounted to vary the carriage path length and which cuts off the electricity to the main drive motor. Fastened to the carriage is a clamp, 30–31, which holds securely the main drive cable.

An alternative carriage drive (see FIG. 3) comprises a variable speed, reversible motor drive, turning a screw shaft, 32; a ball nut, 33, riding on the screw shaft and mounted in rotationally fixed position on the carriage, under the transfer support platform; and ball bushings, 37, mounted in fixed positions to the carriage which ride on guide rods, 39, which are parallel to the screw shaft and are mounted in fixed relationship to the base of the machine. Means are provided for making slight adjustments in the position of the rods to insure proper alignment. In addition, since the guide rods, 39, are subject to deflection when pressure is being applied to the matrix-receptor sandwich, mounting means, e.g., a scotch yoke (not shown) are provided to allow the ball nut, 33, to move slightly linearly with respect to the carriage to avoid the ball nut from binding on the screw shaft, 32.

Located between the two sideplates and rotatably mounted on two angled mounting plates, 44, is the pressure application roller, 9, (see FIG. 2). These mounting plates are fastened to a pivoting shaft, 45, which is mounted in rotatable relationship with each sideplate. A bracket, 46, for holding a thermal sensor, 47, in contact with or in close proximity to the surface of the pressure application roller is also fixed to the pivoting shaft. Other mounting means known in the art may be used to achieve proper sensor position. The angled mounting plates are simultaneously pivoted by cams, 49, one mounted in the same rotational orientation at each end of a camshaft, 50, and in contact with the cam following groove, 51, opposite the pressure application roller. The camshaft is rotatably mounted in each sideplate and is fixed to a hand lever, 52, outside of the sideplate. Adjustable stops (not shown) mounted on the carriage interfere with and limit the swing of the cams and allow for adjustment of the pressure exerted on the matrix-image receptor sandwich.

The pressure application roller, 9, is fabricated from metal and is bored along its axis to accommodate with a minimum of clearance an electrical resistance heating rod, 55, which does not rotate with the roller. A thickwalled roller design is used because of its heat reservoir capabilities. Alternative roller designs, having low heat capacity and fast acting temperature control are described in U.S. Pat. No. 3,189,729 and U.S. Pat. No. 3,201,588.

A heat lamp, 35, or other external heat radiation means may be placed over the pressure application roller to quickly replace the heat absorbed by the matrix-receptor sandwich and maintain constant roller surface temperature.

Figures 3, 4:
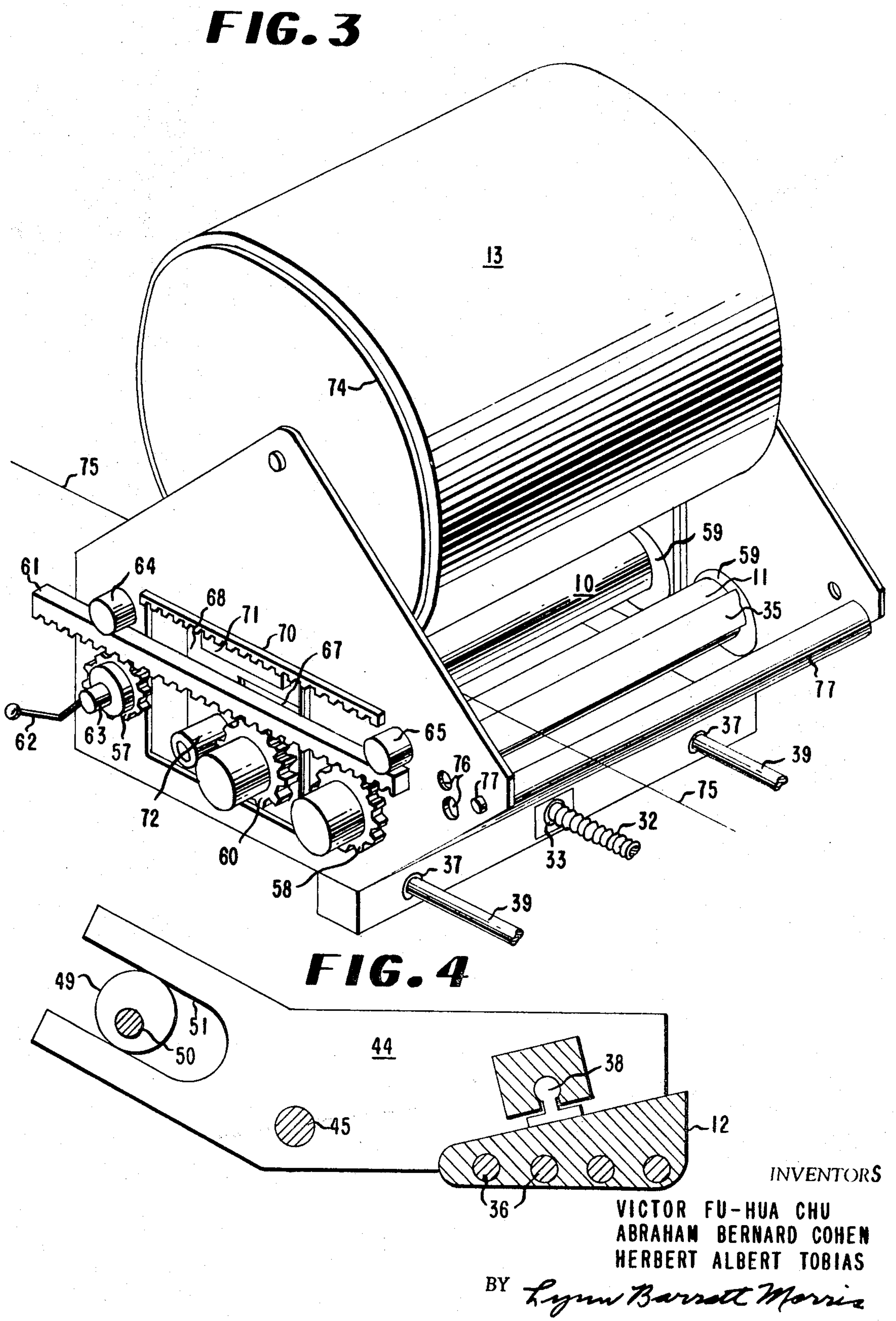
FIG. 3 is an isometric view, with parts broken away and in section, of an alternative carriage and associated parts.
FIG. 4 is a side view, with parts in section, of a pressure application shoe.

A nonrotating pressure application shoe, 12, incorporating internal heaters, 36, may be pivot mounted in the angled mounting plates, 44, in place of the pressure application roller, 9, the pivot, 38, allowing the shoe surface to lie flat on the matrix-image receptor sandwich during pressure application (see FIG. 4).

Figures 5, 6:
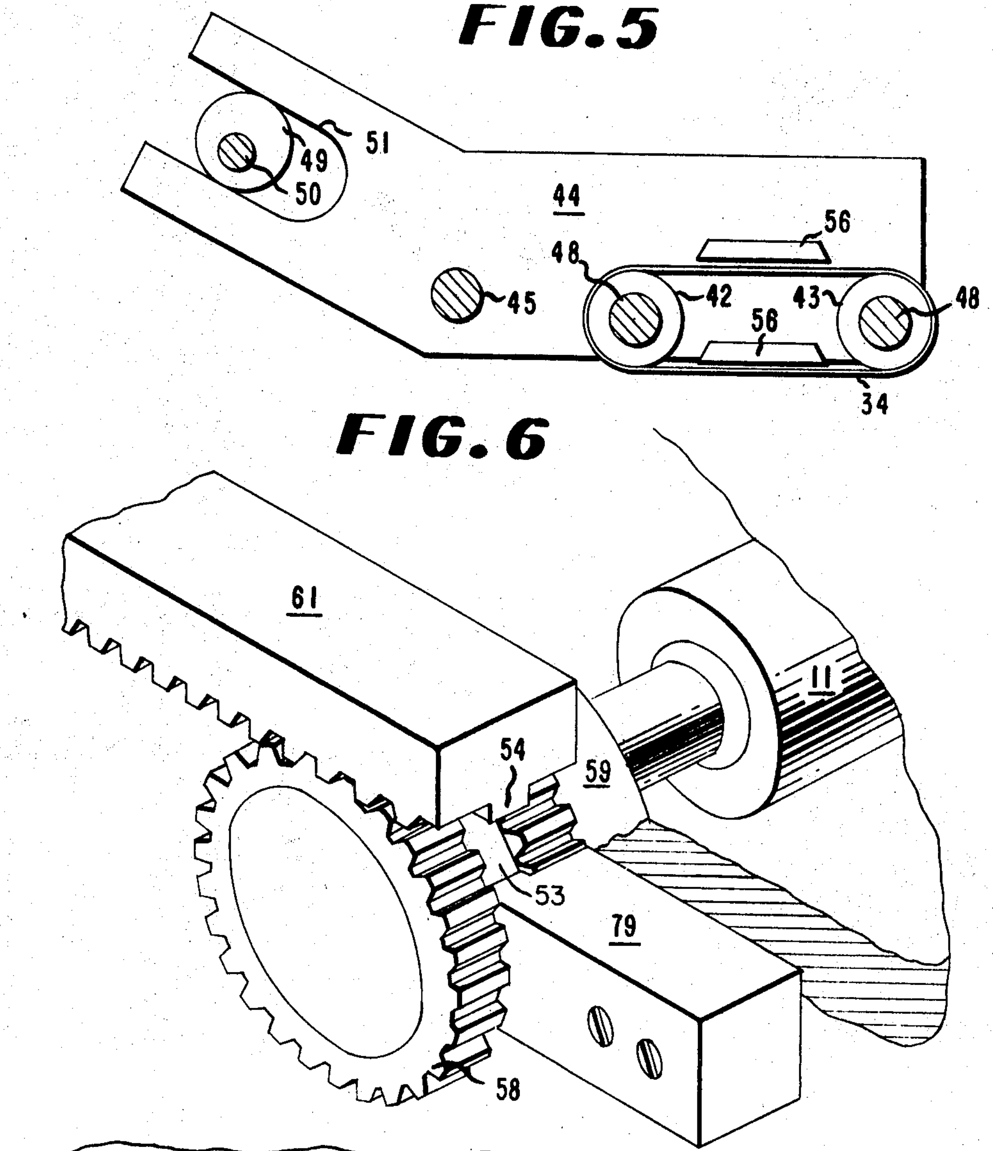
FIG. 5 is a side view, with parts in section, of a pressure application belt.
FIG. 6 is an isometric view, with parts in section, of a portion of a pressure roller housing pinion and rack alignment mechanism for the carriage embodiment of FIG. 3.
Figure 7:
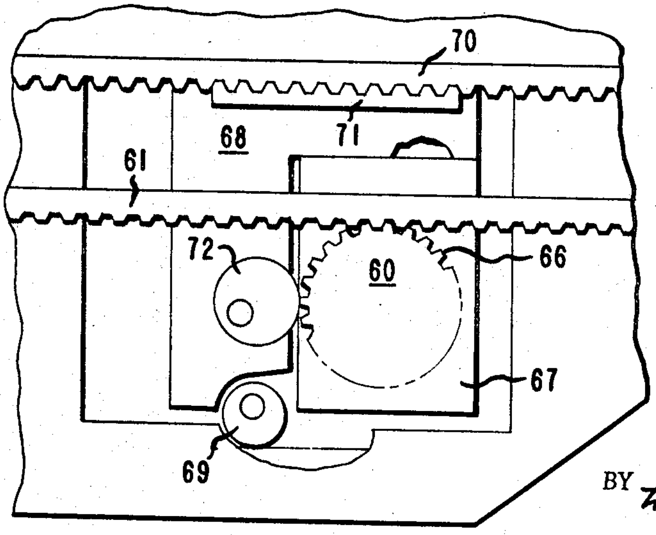
FIG. 7 is a side elevation of a mechanism for centerline adjustment and independent pressure application adjustment between plural pressure application rollers for the carriage of FIG. 3.

A pressure application system employing an endless belt, 34, passing about two rollers, 42, 43, which may contain internal heating elements 48, which coact with external heater platens, 56, to keep the belt surface temperature constant may be substituted for the single pressure application roller, 9 (see FIG. 5).

Alternatively the carriage may include a two pressure roller system (see FIG. 3) to minimize longitudinal relative movement between the matrix support and the image-receptor. In such a system the leading roller, 10, serves as the laminating roller and the trailing roller, 11, as the stripping roller. Each roller is rotatably mounted in a bearing housing, 59, FIG. 6, which is also capable of being rotated with respect to the carriage. The center of rotation of each roller is offset from the center of rotation of its bearing housing to allow vertical lift of the roller from the transfer support surface. Each bearing housing is fixed to a pinion, 58, 60, which meshes with a rack, 61, which is driven by a hand lever, 62, fixed to a pinion, 57, on pinion bearing shaft, 63, the lever being held in its set position during pressing, stripping or machine idling by spring means, (not shown). The line of travel of the rack is constrained by the roller pinions, 58, 60, the lever pinion, 57, and two guide posts 64, 65. The rack and pinion system may be kept in alignment (see FIG. 6) by a keyway, 53, cut in the face of each pinion, 57, 58, and 60, in which rides a key, 54, in the rack face and a key bracket, 79, mounted on the sideplate. The swing of the hand lever is limited by adjustable stops (not shown). The combination of the hand lever, rack and pinion, and eccentrically mounted rollers yields a mechanical advantage which allows for high pressures to be applied to the matrix-receptor sandwich with relatively low force applied to the hand lever by the machine operator.

In this alternative carriage the bearing mount for the leading roller, 10, may be mounted in a housing that is fixed or one that allows for adjustment of the distance between the centerlines of the leading roller, 10, and the trailing roller, 11. One method of achieving this centerline adjustment is to mount the leading roller bearing, 66, in an inner housing, 67, that is keyed into an outer housing, 68. The outer housing is supported on a cam, 69, which rides in a shoulder cut into the carriage sideplate and its longitudinal position is determined stepwise by the meshing of a rack, 70, mounted on the sideplate and a rack, 71, mounted on the outer housing. When the cam is rotated the outer housing drops sufficiently to disengage the racks, 70 and 71, and the pinion, 60, and rack 61 to allow for longitudinal adjustment of the outer housing. The racks, 70 and 71, are keyed respectively into the sideplate and outer housing to insure proper alignment of the outer housing and to prevent binding in the adjustment means. When the outer housing is elevated on the cam, 69, so that the racks and pinions are meshing, the pressure exerted by the leading roller, 10, on the matrix-receptor sandwich can be adjusted independently of that pressure exerted by the following roller, 11. This is achieved by rotating a cam 72, which is rotatably mounted on the outer housing, 68, and which rides against housing, 67, causing it to slide along its keyway in housing 68. Because pinion, 60, is meshed in rack, 61, it is forced to rotate, which causes the leading roller, 10, to assume a different eccentric position with respect to the trailing roller, 11. The pressure exerted by the leading roller may be independently increased or decreased by this method.

Mounted between the two sideplates and located above the pressure application roller with its axis parallel to that of the pressure application roller is a fixed shaft, 73. A large diameter stripping drum, 13, is rotatably mounted and fixed axially on this shaft using bearing means, one at each end of the drum. The drum diameter is large enough to prevent the matrix from being wound onto itself during stripping. A stripping drum drive sheave, 74, is mounted on the nonrotating shaft and is connected directly or through clutch means to the stripping drum. A drum drive cable, 75, is attached to two cable posts, 40, 41, mounted at opposite ends of the transfer support platform in line with and parallel to the plane of the sheave and is wound around the sheave. As the carriage is driven by the main motor drive, 15, and the drive transmission system, the stripping drum is forced to rotate by the action of the drum drive cable, 75, being wound onto the sheave from one direction and being unwound from the other direction. If the stripping drum drive sheave, 74, is mounted directly to the stripping drum, the sheave diameter will depend on the stripping drum diameter and will be such that the stripping drum rotates at a peripheral speed equal to the surface speed of the carriage. Installing an adjustable clutch between the sheave and the stripping drum would allow for the sheave to be overdriven and the stripping tension to be adjusted. Clamping means may be mounted on the stripping drum to insure that the matrix support is securely fastened to it and to facilitate uniform pull on the matrix support during stripping.

Each sideplate incorporates a series of matching mounting holes, 76, to accommodate a guide roller, 77, which controls the stripping angle of the matrix passing around it. The holes are arranged to allow for a stepwise variation of the stripping angle.

If desired, the machine can be provided with a lamp 78, a source of actinic light, as shown in FIG. 1, to post expose and harden the transferred image, or for other purposes.

The dry image transfer is made by placing the image-receptor, R, on the transfer support platform with the leading edge of the receptor fastened securely to the platform under stop S or by a pressure-sensitive tape. The imagewise exposed matrix, M, is placed in the desired orientation on top of the image receptor with the photohardenable layer in contact with the receptor. The carriage is advanced to a position which places the pressure application roller, the pressure application shoe, or the leading roller in a two-roller system over the matrix-receptor sandwich in from the leading edge of the sandwich but outside of the image area. The nonimaged leading edge of the matrix support is fastened manually to the stripping drum by means of aligning pins on the drum or by means of pressure-sensitive tape (See FIG. 1). The pressure application means is then lowered into contact with the sandwich and simultaneously the carriage begins to traverse the transfer support platform. The sandwich is laminated and stripped in sequence, leaving a transferred image on the receptor while the matrix is wound onto the stripping drum.

We claim:

1. An image-transfer machine comprising
   a. a stationary base member having means on its surface for holding an image-receptor element;
   b. means for aligning an imagewise exposed matrix element with its photohardenable layer and pressing said element into contact with the surface of any receptor element on the surface of the base member, said means including
   c. a traversable carriage above and extending across the base member and element;
   d. an electric motor and driving means for moving the carriage back and forth over the surface of the superposed elements;
   e. an applicator means on the carriage for pressing the matrix element into surface contact with the receptor element as the carriage moves back and forth; and, located above the applicator means,
   f. a revolvable drum disposed on the carriage for holding the matrix in alignment with the receptor element and for stripping the matrix element from the receptor element after pressure is applied to the superposed elements to effect image transfer to any receptor element on the surface of the base member, said drum having means for holding thereto the leading end of the matrix element during the pressing and stripping of said element.

2. A Machine according to claim 14 wherein the base member has a flat surface and means (*e*) embodies at least one roller.

3. A machine according to claim 14 wherein means (*e*) embodies a plurality of rollers capable of adjustment toward and away from each other and of pressure adjustment.

4. A machine according to claim 14 wherein the means for pressing comprises a slidable pressure shoe.

5. A machine according to claim 14 wherein the means for pressing comprises rollers and an interfitting belt.

6. A machine according to claim 14 having heating elements disposed adjacent the superposed elements.

7. A machine according to claim 14 having means for heating the elements while they are in superposition.

8. A machine according to claim 14 having heating means in the pressure means.

9. A machine according to claim 3 wherein the means for adjusting the rollers toward and away from each other embodies a rack and pinion mechanism.

10. A machine according to claim 1 having a cable extending from one end of the machine to the other and around a revolvable drum carried by said carriage to drive said drum.

11. A machine according to claim 3 having cam means for adjusting the pressure rollers to vary the pressure exerted thereby.

12. A machine according to claim 1 having a source of actinic light to harden the transferred image.